(12) United States Patent
Finn et al.

(10) Patent No.: US 10,031,846 B1
(45) Date of Patent: Jul. 24, 2018

(54) TRANSPOSITION OF TWO-DIMENSIONAL ARRAYS USING SINGLE-BUFFERING

(71) Applicant: Altera Corporation, San Jose, CA (US)

(72) Inventors: Simon Peter Finn, High Wycombe (GB); Martin Langhammer, Salisbury (GB)

(73) Assignee: Altera Corporation, San Jose, CA (US)

( * ) Notice: Subject to any disclaimer, the term of this patent is extended or adjusted under 35 U.S.C. 154(b) by 0 days.

(21) Appl. No.: 15/238,734

(22) Filed: Aug. 17, 2016

(51) Int. Cl.
G06F 12/00 (2006.01)
G06F 12/06 (2006.01)
G06F 17/16 (2006.01)
G06F 7/72 (2006.01)

(52) U.S. Cl.
CPC .............. G06F 12/06 (2013.01); G06F 7/727 (2013.01); G06F 17/16 (2013.01)

(58) Field of Classification Search
CPC ........... G06F 12/06; G06F 7/727; G06F 17/16
See application file for complete search history.

(56) References Cited

U.S. PATENT DOCUMENTS 6,105,114 A * 8/2000 Okuno ................ G06F 12/0207
708/402
8,812,819 B1 8/2014 Langhammer

* cited by examiner

*Primary Examiner* — Shawn X Gu
(74) *Attorney, Agent, or Firm* — Fletcher Yoder, P.C.

(57) ABSTRACT

The present embodiments relate to an address generator circuit for addressing a storage circuit. The address generator circuit may generate address signals for read and write access operations at the storage circuit. The write access operation may store a two-dimensional array in the storage circuit and the read access operation may retrieve a transpose of the two-dimensional array from the storage circuit. The address generator circuit may include a status flag generation circuit that generates status flag signals, a modulo adder circuit that receives first and second signals and computes a modulo adder output signal, and an address processing circuit. The address processing circuit may receive the modulo adder output signal from the modulo adder circuit and the plurality of status flag signals from the status flag generation circuit and provide the first and second signals to the modulo adder circuit.

20 Claims, 8 Drawing Sheets

TRANSPOSITION OF TWO-DIMENSIONAL ARRAYS USING SINGLE-BUFFERING

BACKGROUND

The present embodiments relate to integrated circuits and, more particularly, to integrated circuits with circuitry that transposes two-dimensional arrays.

Generating the transpose of a two-dimensional array having M rows and N columns involves swapping the rows of the two-dimensional array (e.g., a matrix A) with the columns of the transpose of the two-dimensional array (e.g., the transposed matrix $A^T$) or the columns of the two-dimensional array (e.g., matrix A) with the rows of the transposed two-dimensional array (e.g., matrix $A^T$). Thus, the transpose of a matrix A with M rows and N columns is a matrix $A^T$ with N rows and M columns. In other words, an element from row i and column j of matrix A (i.e., $A_{ij}$) becomes an element in row j and column i of the transposed matrix $A^T$ (i.e., $A^T_{ji}$).

Generating the transpose of a matrix has many applications in linear algebra including the commutativity of scalar multiplications, which is sometimes also referred to as the computation of the dot product, and the computation of the inverse of the two-dimensional array. For example, the dot product (Au).v where A is a matrix with M rows and N columns, u is an N-dimensional vector, and v an M-dimensional vector can be rewritten as u.($A^T$v) where $A^T$ has N rows and M columns and is the transpose of matrix A.

By way of further preliminaries, it will be understood that throughout this disclosure all "data," "samples," "items," "inputs," "outputs," "values," "addresses,", "difference", "sum" and/or the like that are referred to are represented by electrical signals that are processed by electronic circuitry. Thus references to "data," "samples," "items," "inputs," "outputs," "values," "addresses,", "difference", "sum" and/or the like herein will be understood to always mean "data signals," "sample signals," and/or the like, even though the word "signal" or "signals" may not be expressly stated in all instances.

SUMMARY

An address generator circuit for addressing a storage circuit may include a status flag generation circuit, a modulo adder circuit, and an address processing circuit. The status flag generation circuit may generate a plurality of status flag signals. The modulo adder circuit may receive first and second signals and compute a modulo adder output signal based on the first and second signals. The address processing circuit may receive the modulo adder output signal from the modulo adder circuit and the plurality of status flag signals from the status flag generation circuit. Furthermore, the address processing circuit may provide the first and second signals to the modulo adder circuit and generate address signals for read and write access operations of the storage circuit. The write access operation may store a two-dimensional array in the storage circuit and the read access operation may retrieve a transpose of the two-dimensional array from the storage circuit.

It is appreciated that the embodiments described herein can be implemented in numerous ways, such as a process, an apparatus, a system, a device, or a method executed on a processing machine. Several inventive embodiments of the present invention are described below.

In certain embodiments, the address processing circuit may include a delay circuit and an additional storage circuit. The delay circuit may delay the modulo adder output signal by a predetermined time to provide a delayed modulo adder output signal, and the additional storage circuit may store the delayed modulo adder output signal to provide a stored signal.

If desired, the address processing circuit may further include a multiplexer that receives the stored signal from the additional storage circuit, a constant number signal, and an enable signal, selects the first signal among the stored signal and the constant number signal based on the enable signal, and provides the first signal to the modulo adder circuit.

In certain embodiments, the above mentioned address generator circuit may further include a multiplexer that receives the delayed modulo adder output signal, a constant number signal, and a status flag signal of the plurality of status flag signals, selects the second signal among the delayed modulo adder output signal and the constant number signal based on the status flag signal, and provides the second signal to the modulo adder circuit.

In some embodiments, the above mentioned address generator circuit may further include an additional multiplexer that receives the second signal from the aforementioned multiplexer, an additional constant number signal, and an additional status flag signal of the plurality of status flag signals. The additional multiplexer may select the address signals among the second signal and the additional constant number signal based on the additional status flag signal, and provide the address signals for the read and write access operations of the storage circuit.

In some embodiments, the modulo adder circuit may include an adder, a subtractor, a bit extractor, and a multiplexer. The adder may add the first and second signals from the address processing circuit to generate a sum signal. The subtractor may subtract a constant number signal from the sum signal to generate a difference signal. The bit extractor may receive the difference signal and provide a bit extractor output signal that is indicative of whether the difference signal represents a non-negative number. The multiplexer may receive the sum signal, the difference signal, and the bit extractor output signal and select the modulo adder output signal among the sum signal and the difference signal based on the bit extractor output signal.

In some embodiments, the status flag generation circuit may include a modulo counter circuit that receives an enable signal and counts up to a predetermined number to provide a modulo counter output signal.

If desired, the status flag generation circuit may further include first, second, and third comparators. The first comparator may generate a first status flag signal of the plurality of status flag signals based on a first comparison of the modulo counter output signal with a first constant number signal. The second comparator may generate a second status flag signal of the plurality of status flag signals based on a second comparison of the modulo counter output signal with a second constant number signal. The third comparator may generate a third status flag signal of the plurality of status flag signals based on a third comparison of the modulo counter output signal with a third constant number signal.

Further features of the invention, its nature and various advantages, will be more apparent from the accompanying drawings and the following detailed description of the preferred embodiments.

DETAILED DESCRIPTION

The present embodiments provided herein relate to integrated circuits and, more particularly, to integrated circuits with circuitry that transposes two-dimensional arrays.

Generating the transpose of a two-dimensional array (e.g., a matrix) has many applications in linear algebra including the commutativity of scalar multiplications, which is sometimes also referred to as the computation of the dot product, and the computation of the inverse of the two-dimensional array.

A typical way to implement such two-dimensional array transposition is to use two storage circuits, which may sometimes also be referred to as memory banks. The memory banks may be accessed alternately to store successive complete sets of the data items in the starting order, and the memory bank that is not currently accepting new data items may be addressed to retrieve the previously stored data items in the desired final order.

Requiring two memory banks for this purpose can consume a relatively large amount of memory. Some known techniques that use single-buffering for the transposition of two-dimensional arrays are limited to two-dimensional arrays with M rows and N columns in which M and N are each a power of two (e.g., M=8 and N=16).

Therefore, it may be desirable to generate the transform of a two-dimensional array having numbers of rows and numbers of columns that may be different than powers of two and using single-buffering (i.e., a single storage circuit), which may reduce cost and decrease latency compared to a solution with two memory banks.

It will be recognized by one skilled in the art, that the present exemplary embodiments may be practiced without some or all of these specific details. In other instances, well-known operations have not been described in detail in order not to unnecessarily obscure the present embodiments.

Figure 1:
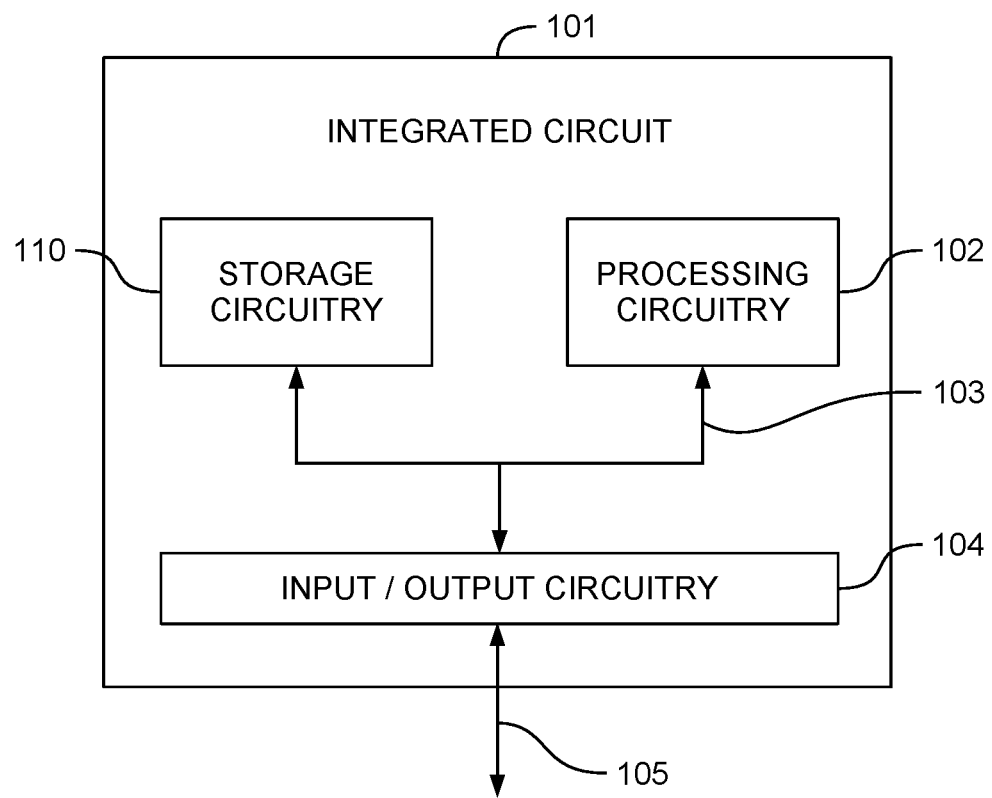
FIG. 1 is a diagram of an illustrative integrated circuit in accordance with an embodiment.

An illustrative embodiment of an integrated circuit 101 is shown in FIG. 1. Integrated circuit 101 may have multiple components. These components may include processing circuitry 102, storage circuitry 110, and input-output circuitry 104. Processing circuitry 102 may include embedded microprocessors, digital signal processors (DSP), microcontrollers, or other processing circuitry.

Input-output circuitry 104 may include parallel input-output circuitry, differential input-output circuitry, serial data transceiver circuitry, or other input-output circuitry suitable to transmit and receive data. Internal interconnection resources 103 such as conductive lines and busses may be used to send data from one component to another component or to broadcast data from one component to one or more other components. External interconnection resources 105 such as conductive lines and busses, optical interconnect infrastructure, or wired and wireless networks with optional intermediate switches may be used to communicate with other devices.

Storage circuitry 110 may have random-access memory (RAM), read-only memory (ROM), or other addressable memory elements. Storage circuitry 110 may be a single-port memory, a dual-port memory, a quad-port memory, or have any other arbitrary number of ports. If desired, storage circuitry 110 may be implemented as a single-port memory with control circuitry that emulates dual-port, quad-port, or other multi-port behavior.

Processing circuitry 102 may access storage circuitry 110 by sending read and/or write requests over interconnection resources 103 to storage circuitry 110. In some embodiments, external components may access storage circuitry 110 via external interconnection resources 105, input-output circuitry 104, and interconnection resources 103. In response to receiving a read request, storage circuitry 110 may retrieve the requested data during a read access operation and send the retrieved data over interconnection resources 103 to the requestor. In case of a write request, storage circuitry 110 may store the received data during a write access operation.

The aforementioned integrated circuit 101 may include a two-dimensional array transpose circuit. If desired, processing circuitry 104 and storage circuitry 110 may implement the two-dimensional array transpose circuit. For example, processing circuitry 104 may generate read and write address signals for performing read and write access operations at storage circuitry 110 such that a two-dimensional array is stored in storage circuitry 110 during a write access operation and the transpose of the two-dimensional array is retrieved during a read access operation.

Figure 2:
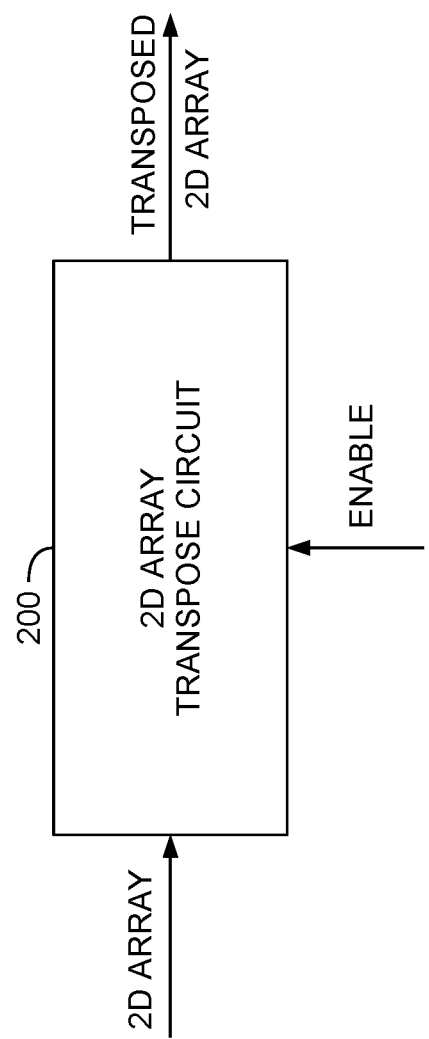
FIG. 2 is a diagram of an illustrative circuit that generates a transpose of a two-dimensional array in accordance with an embodiment.

An illustrative embodiment of a two-dimensional array transpose circuit 200 is shown in FIG. 2. The two-dimensional array transpose circuit 200 may receive a two-dimensional array, which is sometimes also referred to as a 2D array, at an input and provide at an output a transpose of the two-dimensional array, which is sometimes also referred to as a transposed 2D array. If desired, the two-dimensional array circuit 200 may be activated when receiving an enable signal.

As an example, consider the scenario in which two-dimensional array transpose circuit 200 receives a two-dimensional array with three rows (M=3) with row numbers r being 0, 1, and 2 and five columns (N=5) with column numbers c being 0, 1, 2, 3, and 4.

The two-dimensional array may include a first row m0 (i.e., r=0) with elements (a, b, c, d, e), a second row m1 (i.e., r=1) with elements (f, g, h, i, j), and a third row m2 (i.e., r=2) with elements (k, l, m, n, o).

In this scenario, linearization may result in a stream with positions i=(0, 1, 2, 3, 4, 5, 6, 7, 8, 9, 10, 11, 12, 13, 14) having respective entries (a, b, c, d, e, f, g, h, i, j, k, l, m, n, o).

The position i for each element may be computed by $$i = r*N + c \quad (1)$$

where r is the row number, N is the number of columns, and c is the column number. For example, "l" is in row m2 (i.e., r=2) and the second column (i.e., c=1), with N=5. Thus the position of "l" in the stream is computed as i=2*5+1=11.

The transposed two-dimensional array of the above described example may include five rows (M=5) and three columns (N=3), with row m0 (i.e., r=0) having elements (a, f, k), row m1 (i.e., r=1) having elements (b, g, l), row m2 (i.e., r=2) elements (c, h, m), row m3 (i.e., r=3) elements (d, i, n), and row m4 (i.e., r=4) elements (e, j, o).

Linearization of the transposed array may result in a transposed stream with positions j=(0, 1, 2, 3, 4, 5, 6, 7, 8, 9, 10, 11, 12, 13, 14) having respective entries (a, f, k, b, g, l, c, h, m, d, i, n, e, j, o).

The position j for each element may be computed by $$j = r + c*M \quad (2)$$

where r is the row number, c is the column number, and M is the number of rows of the original two-dimensional array (not the transposed two-dimensional array). For example, "l" was in row m2 (i.e., r=2) and the second column (i.e., c=1) of the original two-dimensional array with M=3. Thus, the position of "l" in the transposed stream is computed as j=2+1*3=5.

The above observed relationship between linearization of the two-dimensional array and linearization of the transposed two-dimensional array may be generalized. For example, multiplying equation (1) with M leads to $$i*M = (r*N + c)*M = r*N*M + c*M \quad (3)$$

Furthermore, the modulo (M*N−1) multiplication of M with N is equal to one $$(M*N) \bmod (M*N-1) = 1 \quad (4)$$

Combining equations (3) and (4) leads to $$(i*M) \bmod (M*N-1) = (r + c*M) \bmod (M*N-1) = j \bmod (M*N-1) \quad (5)$$

The last element in the two-dimensional array (i.e., r=M−1, c=N−1) is at position i=(N*M−1) and the last element in the transposed two-dimensional array at position j=(N*M−1).

Thus, a function P(i) that maps from input positions to output positions is defined as:

$$P(i) = N*M - 1, \text{ when } i = N*M - 1 \quad (6)$$

$$P(i) = (i*M) \bmod (N*M-1), \text{ otherwise} \quad (7)$$

Multiplying equation (2) with N leads to $$j*N = (r + c*M)*N = r*N + c*N*M \quad (8)$$

Combining equations (4) and (8) leads to $$(j*N) \bmod (N*M-1) = (r*N + c) \bmod (N*M-1) = i \bmod (N*M-1) \quad (9)$$

Thus, an inverse function Q(j) to P(i) which maps output positions onto input positions is defined as:

$$Q(j) = N*M - 1, \text{ when } j = N*M - 1 \quad (10)$$

$$Q(j) = (j*N) \bmod (N*M-1), \text{ otherwise} \quad (11)$$

Note, that $P^2(N*M-1) = P(P(N*M-1)) = P(N*M-1) = M*N-1$ and that for $0 \leq i < N*M-1$: $P^2(i) = P(P(i)) = P((i*M) \bmod (N*M-1)) = (((i*M) \bmod (N*M-1))*M) \bmod (N*M-1) = ((i*M*M) \bmod (N*M-1)) \bmod (N*M-1) = (i*M^2) \bmod (N*M-1)$.

Thus, mathematical induction shows that $$P^k(N*M-1) = N*M - 1 \quad (12)$$

$$P^k(i) = (i*M^k) \bmod (N*M-1) \text{ for } 0 \leq i < N*M-1 \quad (13)$$

for any k, and similarly that:

$$Q^k(N*M-1) = N*M - 1 \quad (14)$$

$$Q^k(j) = (j*N^k) \bmod (N*M-1) \text{ for } 0 \leq j < N*M-1 \quad (15)$$

Figure 3:
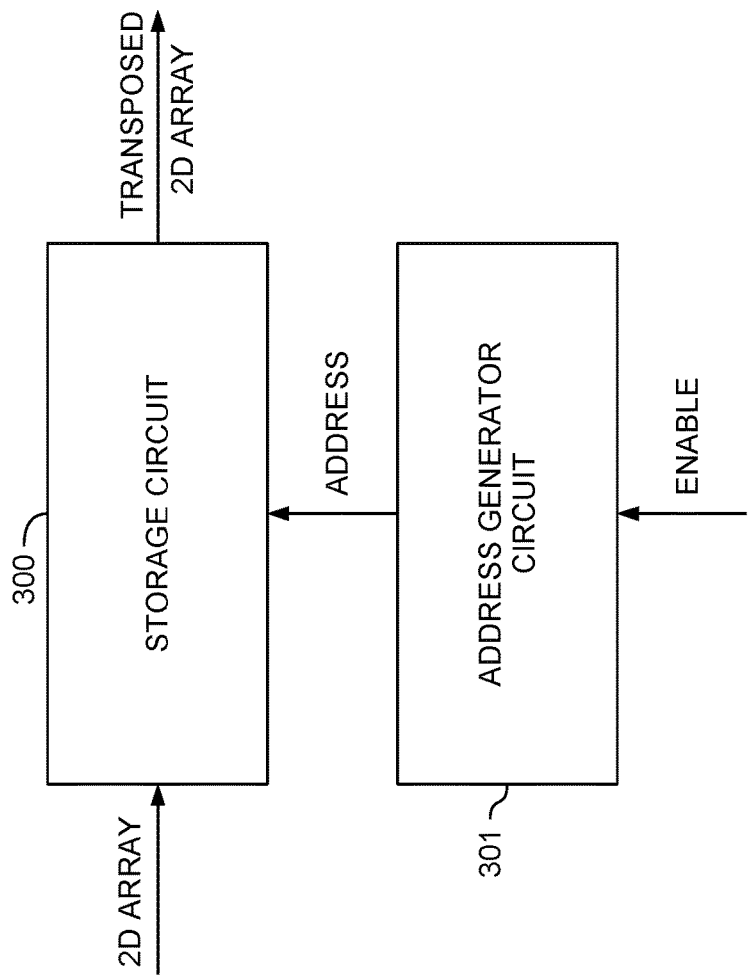
FIG. 3 is a diagram of an illustrative address generator circuit coupled to a storage circuit for generating a transpose of a two-dimensional array in accordance with an embodiment.

An illustrative embodiment of the two-dimensional array transpose circuit 200 of FIG. 2 is shown in FIG. 3. The two-dimensional array transpose circuit may include storage circuit 300 and address generator circuit 301. Storage circuit 300 may receive a two-dimensional array and address signals from address generator circuit 301 and store the two-dimensional array during a write access operation. Storage circuit 300 may receive address signals from address generator circuit 301 to generate a transpose of the stored two-dimensional arrays by retrieving the stored two-dimensional array from storage circuit 300 during a read access operation. In some embodiments, storage circuit 300 may perform a read access operation for the $k^{th}$ block using the write address generated using $Q^k()$ and read the $k^{th}$ block back using the read address generated using $Q^{k+1}()$.

As an example, consider the scenario in which storage circuit 300 receives blocks 0, 1, and 2 that each include a respective two-dimensional array having three rows (M=3) and five columns (N=5). For example, the $0^{th}$ block may include the first two-dimensional array with a first row m0 (i.e., r=0) with elements (a0, b0, c0, d0, e0), a second row m1 (i.e., r=1) with elements (f0, g0, h0, i0, j0), and a third row m2 (i.e., r=2) with elements (k0, l0, m0, n0, o0).

The $1^{st}$ block may include the second two-dimensional array with a first row m0 (i.e., r=0) with elements (a1, b1, c1, d1, e1), a second row m1 (i.e., r=1) with elements (f1, g1, h1, i1, j1), and a third row m2 (i.e., r=2) with elements (k1, l1, m1, n1, o1).

The $2^{nd}$ block may include the third two-dimensional array with a first row m0 (i.e., r=0) with elements (a2, b2, c2, d2, e2), a second row m1 (i.e., r=1) with elements (f2, g2, h2, i2, j2), and a third row m2 (i.e., r=2) with elements (k2, l2, m2, n2, o2).

In this scenario, linearization may result in a stream with positions i=(0, 1, 2, 3, 4, 5, 6, 7, 8, 9, 10, 11, 12, 13, 14) having respective entries (a0, b0, c0, d0, e0, f0, g0, h0, i0, j0, k0, l0, m0, n0, o0) for block 0, (a1, b1, c1, d1, e1, f1, g1, h1, i1, j1, k1, l1, m1, n1, o1) for block 1, and (a2, b2, c2, d2, e2, f2, g2, h2, i2, j2, k2, l2, m2, n2, o2) for block 2.

If desired, address generator circuit 301 may generate write and read addresses according to equations (14) and (15).

For example, for block 0, address generator circuit 301 may generate for each respective position of the stream the following respective addresses in storage circuit 300:

TABLE 1

| Write addresses for block 0 | | | | | | | | | | | | | | | |
|---|---|---|---|---|---|---|---|---|---|---|---|---|---|---|---|
| I | 0 | 1 | 2 | 3 | 4 | 5 | 6 | 7 | 8 | 9 | 10 | 11 | 12 | 13 | 14 |
| $Q^0(i)$ | 0 | 1 | 2 | 3 | 4 | 5 | 6 | 7 | 8 | 9 | 10 | 11 | 12 | 13 | 14 |

Thus, storage circuit 300 may store the first two-dimensional array of block 0 at the following addresses:

TABLE 2

Storage circuit contents at respective addresses after the write access operation of block 0

| 0  | 1  | 2  | 3  | 4  | 5  | 6  | 7  | 8  | 9  | 10 | 11 | 12 | 13 | 14 |
|----|----|----|----|----|----|----|----|----|----|----|----|----|----|----|
| a0 | b0 | c0 | d0 | e0 | f0 | g0 | h0 | i0 | j0 | k0 | l0 | m0 | n0 | o0 |

For example, the element at position i=3 (i.e., d0) may be stored at address $Q^0(3)=3$, and the element at position i=7 (i.e., h0) may be stored at address $Q^0(7)=7$.

Based on equations (14) and (15), address generator circuit 301 may generate for each respective position of the stream the following respective addresses $Q^1(i)=Q^1(j)$ for write and read access operations at storage circuit 300:

TABLE 3

Write addresses for block 1 and read addresses for block 0

| i, j     | 0 | 1 | 2  | 3 | 4 | 5  | 6 | 7 | 8  | 9 | 10 | 11 | 12 | 13 | 14 |
|----------|---|---|----|---|---|----|---|---|----|---|----|----|----|----|----|
| $Q^1( )$ | 0 | 5 | 10 | 1 | 6 | 11 | 2 | 7 | 12 | 3 | 8  | 13 | 4  | 9  | 14 |

Thus, performing a read access operation at storage circuit 300 to retrieve block 0 may produce the following output stream:

TABLE 4

Output stream after the read access operation of block 0

| 0  | 1  | 2  | 3  | 4  | 5  | 6  | 7  | 8  | 9  | 10 | 11 | 12 | 13 | 14 |
|----|----|----|----|----|----|----|----|----|----|----|----|----|----|----|
| a0 | f0 | k0 | b0 | g0 | l0 | c0 | h0 | m0 | d0 | i0 | n0 | e0 | j0 | o0 |

For example, the element at position j=3 of the output stream (i.e., b0) may be retrieved from address $Q^1(3)=1$ of storage circuit 300, and the element at position j=7 of the output stream (i.e., h0) may be retrieved from address $Q^1(7)=7$.

Interpreting every three successive elements of the output stream as a row of a two-dimensional array leads to a first row m0 (i.e., r=0) with elements (a0, f0, k0), a second row m1 (i.e., r=1) with elements (b0, g0, l0), a third row m2 (i.e., r=2) with elements (c0, h0, m0), a fourth row m3 (i.e., r=3) with elements (d0, i0, n0), and a fifth row m4 (i.e., r=4) with elements (e0, j0, o0), which is the transpose of the first two-dimensional array.

After having performed the read access operation of block 0, storage circuit 300 may store the second two-dimensional array of block 1 at the addresses shown in TABLE 3.

TABLE 5

Storage circuit contents at respective addresses after the write access operation of block 1

| 0  | 1  | 2  | 3  | 4  | 5  | 6  | 7  | 8  | 9  | 10 | 11 | 12 | 13 | 14 |
|----|----|----|----|----|----|----|----|----|----|----|----|----|----|----|
| a1 | d1 | g1 | j1 | m1 | b1 | e1 | h1 | k1 | n1 | c1 | f1 | i1 | l1 | o1 |

For example, the element in the input stream at position i=3 (i.e., d1) may be stored at address $Q^1(3)=1$ and the element at position i=7 (i.e., h1) may be stored at address $Q^1(7)=7$.

Based on equations (14) and (15), address generator circuit 301 may generate for each respective position of the stream the following respective addresses $Q^2(i)=Q^2(j)$ for write and read access operations at storage circuit 300:

TABLE 6

Write addresses for block 2 and read addresses of block 1

| i, j     | 0 | 1  | 2 | 3 | 4 | 5  | 6  | 7 | 8 | 9  | 10 | 11 | 12 | 13 | 14 |
|----------|---|----|---|---|---|----|----|---|---|----|----|----|----|----|----|
| $Q^2( )$ | 0 | 11 | 8 | 5 | 2 | 13 | 10 | 7 | 4 | 1  | 12 | 9  | 6  | 3  | 14 |

Thus, performing a read access operation at storage circuit 300 for block 1 may produce the following output stream:

TABLE 7

Output stream after the read access operation of block 1

| 0  | 1  | 2  | 3  | 4  | 5  | 6  | 7  | 8  | 9  | 10 | 11 | 12 | 13 | 14 |
|----|----|----|----|----|----|----|----|----|----|----|----|----|----|----|
| a1 | f1 | k1 | b1 | g1 | l1 | c1 | h1 | m1 | d1 | i1 | n1 | e1 | j1 | o1 |

For example, the element at position j=3 of the output stream (i.e., b1) may be retrieved from address $Q^2(3)=5$ of storage circuit 300, and the element at position j=7 of the output stream (i.e., h1) may be retrieved from address $Q^2(7)=7$.

Interpreting every three successive elements of the output stream as a row of a two-dimensional array leads to a first row m0 (i.e., r=0) with elements (a1, f1, k1), a second row m1 (i.e., r=1) with elements (b1, g1, l1), a third row m2 (i.e., r=2) with elements (c1, h1, m1), a fourth row m3 (i.e., r=3) with elements (d1, i1, n1), and a fifth row m4 (i.e., r=4) with elements (e1, j1, o1), which is the transpose of the second two-dimensional array.

After having performed the read access operation of block 1, storage circuit 300 may store the third two-dimensional array of block 2 at the addresses shown in TABLE 6.

TABLE 8

Storage circuit contents at respective addresses after the write access operation of block 2

| 0  | 1  | 2  | 3  | 4  | 5  | 6  | 7  | 8  | 9  | 10 | 11 | 12 | 13 | 14 |
|----|----|----|----|----|----|----|----|----|----|----|----|----|----|----|
| a2 | j2 | e2 | n2 | i2 | d2 | m2 | h2 | c2 | l2 | g2 | b2 | k2 | f2 | o2 |

For example, the element in the input stream at position i=3 (i.e., d2) may be stored at address $Q^2(3)=5$ and the element at position i=7 (i.e., h2) may be stored at address $Q^2(7)=7$.

Storage circuit 300 may include single-port memory circuitry or multi-port memory circuitry such as dual-port circuitry or quad-port circuitry, just to name a few. If desired, storage circuit 300 may implement read-before-write behavior. In other words, a read access operation may retrieve the content of the storage circuit 300 from a location based on a predetermined address before new content is stored at that same location during a write access operation. In some embodiments, registers or other storage circuitry may be coupled with storage circuit 300 to enable read-before-write behavior.

As another example, consider the scenario in which read and write operations are scheduled at a same clocking event. In this scenario, storage circuit 300 may include separate clock connections for the read clock and the write clock. If desired, the write clock may be delayed compared to the read clock, thereby enabling read-before-write behavior even though a read and a write access operation are scheduled at the same clocking event.

The delay between the read event and the write event may be comparatively small since read and write access operations occur at the same addresses in storage circuit 300. For example, after reading back the first seven items of block 1 (i.e., a1, g1, b1, k1 c1, f1, and l1) from storage circuit 300, the eight unread items (i.e., d1, j1, m1, e1, h1, n1, i1 and o1) occupy the following memory locations:

TABLE 9

| Unread items of block 1 in the storage circuit | | | | | | | | | | | | | | |
|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 |
| | d1 | j1 | m1 | | e1 | h1 | | n1 | | | | i1 | | o1 |

After the first 7 items of storage circuit 300 have been read back, the first 7 items of the next stream may perform write access operations to the same memory locations:

TABLE 10

| Written items of block 2 in the storage circuit | | | | | | | | | | | | | | |
|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 |
| a2 | | e2 | | | d2 | | | c2 | | g2 | b2 | | f2 | |

Thus, the overall buffer contents may be:

TABLE 11

| Storage circuit contents during read and write access operations | | | | | | | | | | | | | | |
|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 |
| a2 | d1 | e2 | j1 | m1 | d2 | e1 | h1 | c2 | n1 | g2 | b2 | i1 | f2 | o1 |

Figure 4:
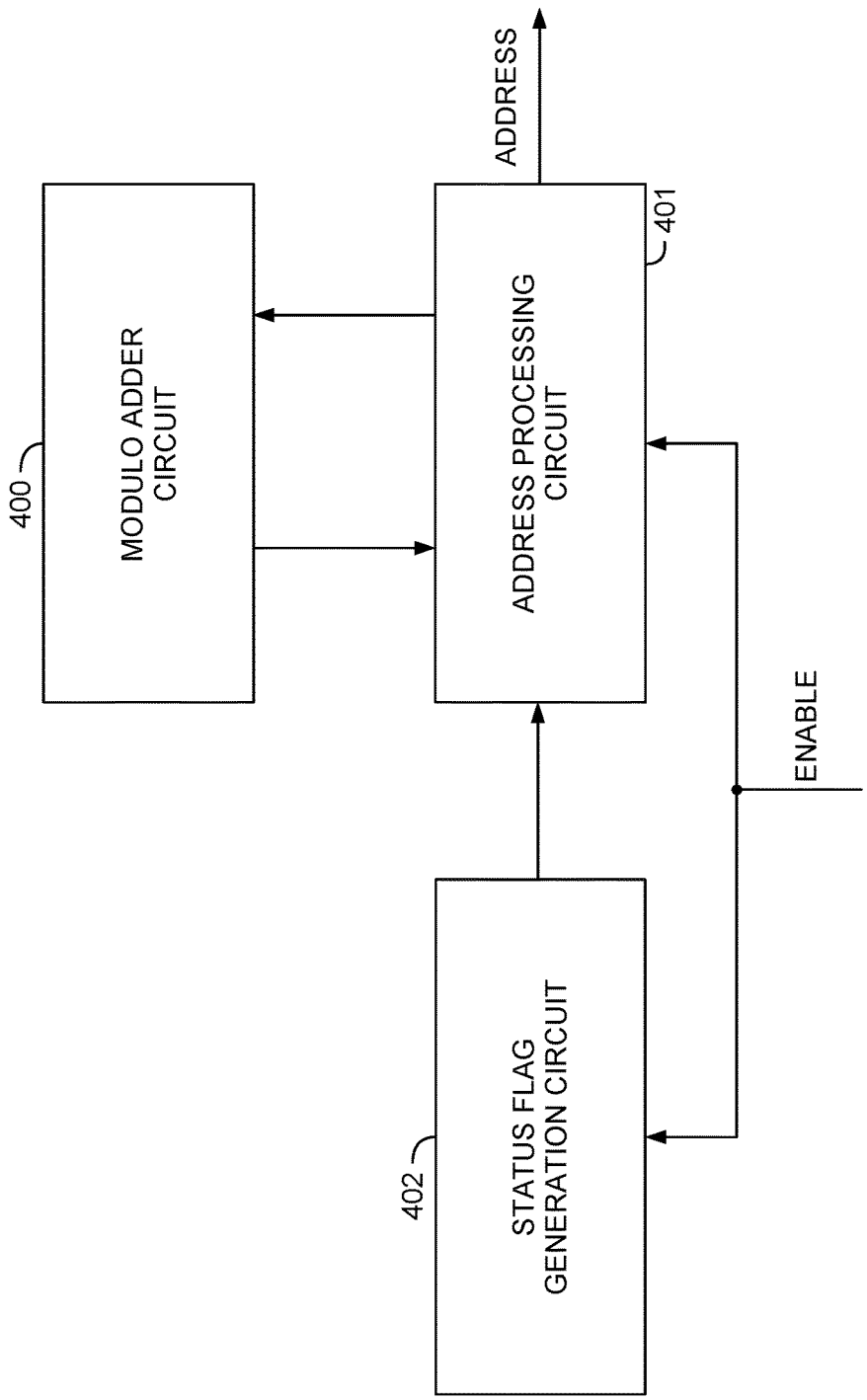
FIG. 4 is a diagram of an illustrative address generator circuit including a status flag generation circuit, a modulo adder circuit, and an address processing circuit in accordance with an embodiment.

An illustrative embodiment of the address generator circuit 301 of FIG. 3 is shown in FIG. 4. The address generator circuit 301 may include a status flag generation circuit 402, a modulo adder circuit 400, and an address processing circuit 401. The status flag generation circuit 402 may receive an enable signal, generate status flag signals based on the enable signal, and send the status flag signals to the address processing circuit 401.

The address processing circuit 401 may receive the enable signal, a modulo adder output signal from the modulo adder output circuit 400, and send first and second signals to the modulo adder output circuit 400.

If desired, the address processing circuit may send the address signals for the read and write access operations to storage circuit 300. If desired, the address signals for the write access operation may enable the storage of a two-dimensional array in storage circuit 300 and the signals for the read access operation may retrieve a transpose of the two-dimensional array from storage circuit 300.

Modulo adder output circuit 400 may perform a modulo addition of the first and second signals to generate the modulo adder output signal. Modulo adder circuit 400 may be implemented using any modulo adder architecture. For example, modulo adder circuit 400 may perform a modulo X addition by adding the first and second signals to generate a sum and recursively subtracting X from the sum as long as the result is greater than or equal to X.

Figure 5:
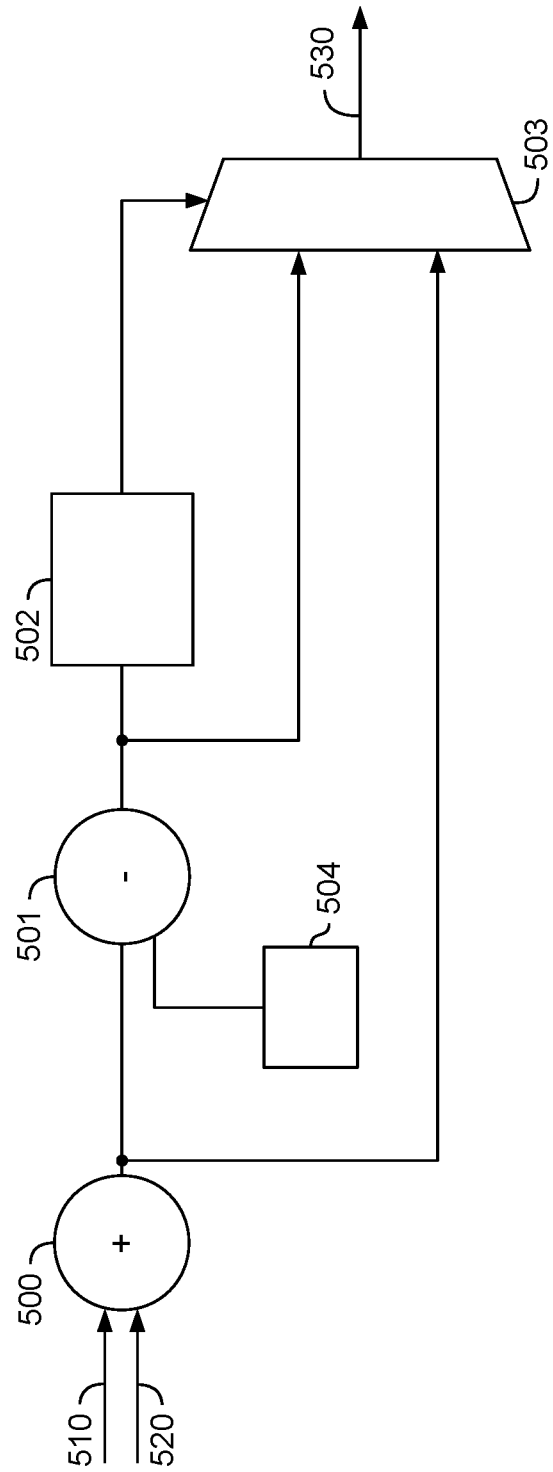
FIG. 5 is a diagram of an illustrative modulo adder circuit in accordance with an embodiment.

An illustrative embodiment of a modulo adder circuit such as modulo adder circuit 400 is shown in FIG. 5. As shown, the modulo adder circuit may include adder 500, subtractor 501, bit extractor 502, constant number storage 504 and multiplexer 503.

Adder 500 may include logic gates and implement any adder architecture such as a ripple-carry adder, a carry-save adder, a carry-lookahead adder, just to name a few. As shown, adder 500 may receive first and second signals at inputs 510 and 520 and provide a sum signal to subtractor 501 and multiplexer 503 of the modulo adder circuit.

Constant number storage 504 may include any memory architecture capable of storing a constant number. For example, constant number storage 504 may include multiple registers where every register stores a bit of the constant number. If desired, constant number storage 504 may include read-only memory (ROM), random-access memory (RAM), or any other memory capable of storing a constant number.

Constant number storage 504 may store a predetermined constant number. For example, constant number storage 504 may store M*N−1 where M is the number of rows and N the number of columns of a two-dimensional array. If desired, constant number storage 504 may be omitted and the constant number may be supplied through an input port to the modulo adder circuit.

Subtractor 501 may generate a difference of the sum signal and the constant number. If desired, constant number storage 504 may store the two's complement of the constant number that is to be subtracted from the sum and subtractor 501 may be replaced by an adder.

Multiplexer 503 may receive the difference signal from subtractor 501, the sum signal from adder 500 and a bit extractor output signal from bit extractor 502 and select between the sum signal and the difference signal based on the bit extractor output signal.

Bit extractor 502 may receive the difference from subtractor 501 and provide a bit extractor output signal. If desired, bit extractor output signal may be logical '1' when the difference signal represents a negative number and logical '0' otherwise.

Multiplexer 503 may select the sum signal if the difference is a negative number (e.g., if constant number 504 is predetermined to be M*N−1 and the sum is smaller than M*N−1). Multiplexer 503 may select the difference signal, when bit extractor 502 receives a non-negative number.

Multiplexer 503 may generate at output 530 a modulo adder output signal. In particular, consider the scenario in which constant number 504 is M*N−1 with M=3 rows and N=5 columns. In this scenario, M*N−1 is equal to 14.

Thus, as long as the sum of the first and second signals (510, 520) is smaller than 14, multiplexer 503 will select the sum of the first and second signals as the modulo adder output signal. If the sum of the first and second signal is greater or equal than 14, multiplexer 503 may select the difference from subtractor 501 as the modulo adder output signal.

As shown, the modulo adder output signal is smaller than (M*N−1) as long as the sum of the first and second signals (510, 520) is smaller than 2*(M*N−1)−1. The sum of first and second signals may be designed to be smaller than 2*(M*N−1)−1.

For example, the loop from modulo adder circuit 400 through address processing circuit 401 back to modulo adder circuit 400 may ensure that at least one of the first and second signals (510, 520) is smaller than M*N−1, and thus the sum is always smaller that 2*(M*N−1)−1.

Alternatively, a pre-processing step may ensure that the first and second signals are smaller than M*N−1. For example, in modulo arithmetic $$(X+Y) \bmod(Z) = (X \bmod(Z) + Y \bmod(Z)) \bmod(Z) \quad (16)$$

Thus, generating the first signal (e.g., signal X') from a signal X by performing a modulo (M*N−1) operation on signal X (i.e., X'=X mod(M*N−1)) and generating the second signal (e.g., signal Y') from signal Y by performing a modulo (M*N−1) operation on signal Y (i.e., Y'=Y mod(M*N−1)) ensures that the first and second signal are both smaller than (M*N−1).

Figure 6:
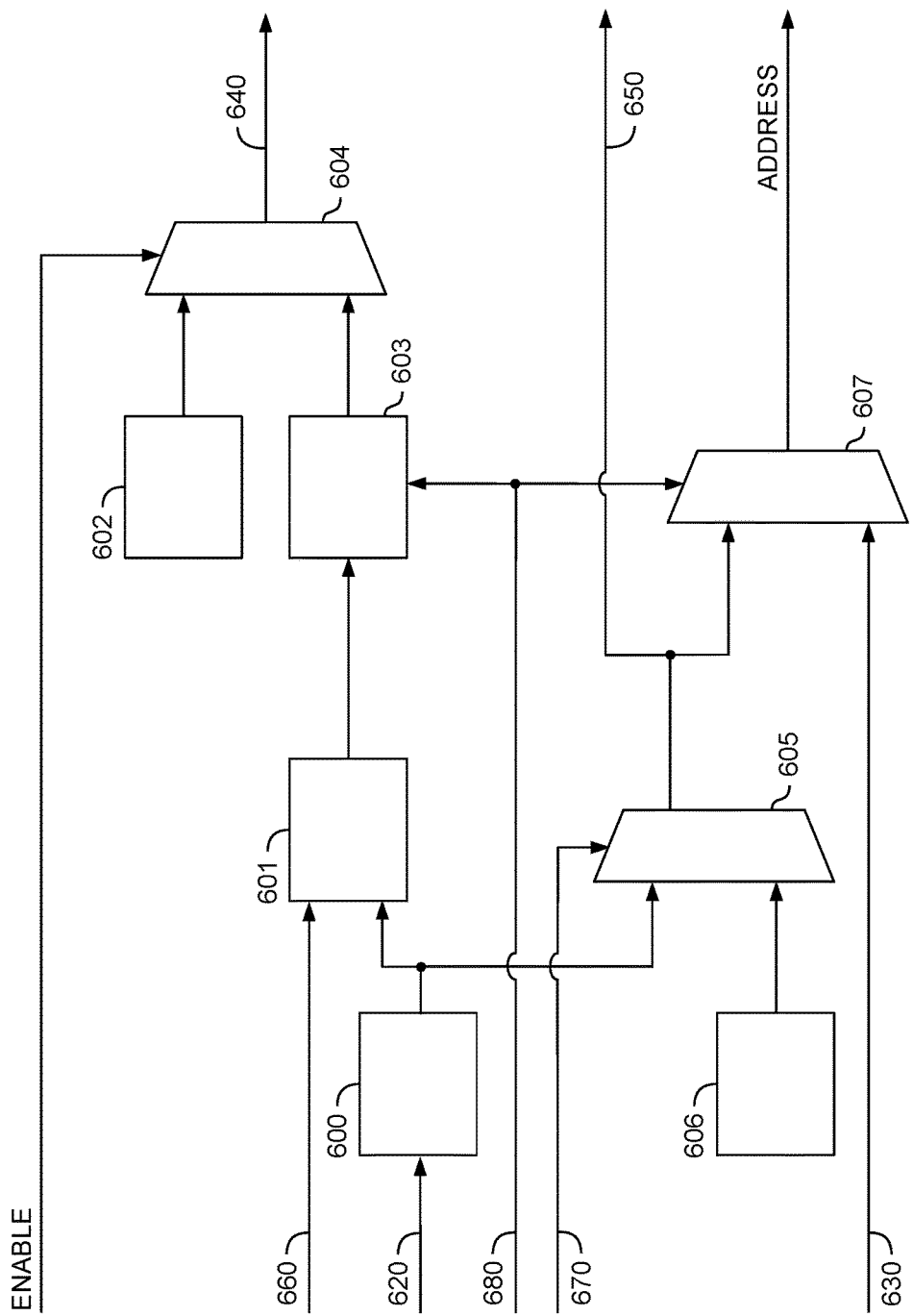
FIG. 6 is a diagram of an illustrative address processing circuit in accordance with an embodiment.

An illustrative embodiment of an address processing circuit such as address processing circuit 401 is shown in FIG. 6. The address processing circuit may receive an enable signal, a modulo adder output signal from a modulo adder circuit such as modulo adder circuit 400 of FIG. 4 at input 620, and status flag signals from a status flag generation circuit such as status flag generation circuit 402 of FIG. 4 at inputs 630, 660, 670, and 680.

The address processing circuit may generate an address signal for performing read and/or write access operations at a storage circuit such as storage circuit 300 of FIG. 3 as well as first and second signals for a modulo adder circuit such as modulo adder circuit 400 of FIG. 4 at outputs 640 and 650, respectively.

The address processing circuit may include delay circuit 600, multiplexers 604, 605, and 607, constant number storage circuits 602 and 606, and latches 601 and 603 that may implement an additional storage circuit. As shown, latches 601 and 603 are initialized to store the number one.

As shown in FIG. 6, delay circuit 600 may receive the modulo adder output signal via input 620, delay the modulo adder output signal, and provide the delayed modulo adder signal to latch 601 and multiplexer 605. If desired, delay circuit 600 may delay the modulo adder output signal by one or more clock cycles.

Constant number storage 602 and 606 may each store a respective constant number. For example, constant number storage 602 and 606 may both store a '0'. In this example, constant number storage 602 and 604 may be combined into a single constant number storage that is coupled to both multiplexers 604 and 605.

Multiplexer 604 may receive the constant number signal from constant number storage 602, a stored signal from latch 603 and an enable signal. Multiplexer 604 may select between the stored signal and the constant number signal based on the enable signal and thereby generate the first signal at output 640 of the address processing circuit.

The constant number stored in constant number storage 602 may be used to initialize the first signal of the modulo adder circuit. If desired, the constant number may be zero, which is selected as long as the additional storage circuit is disabled (i.e., the enable signal is '0').

Multiplexer 605 may receive the delayed modulo adder output signal from delay circuit 600, the constant number signal from constant storage circuit 606 and a status flag signal from a status flag generation circuit such as status flag generation circuit 402 of FIG. 4 at input 670.

Multiplexer 605 may select between the delayed modulo adder output signal and the constant number signal based on the status flag signal and provide the selected signal as the second signal to the modulo adder circuit and to multiplexer 607.

Multiplexer 607 may receive the second signal from multiplexer 605, a status flag signal from a status flag generation circuit such as status flag generation circuit 402 of FIG. 4 at input 680 and a constant number signal via input 630. The multiplexer 607 may select between the second signal and the constant number signal based on the status flag signal and provide the selected signal as the address signals for the read and write access operations of the storage circuit.

Figure 7:
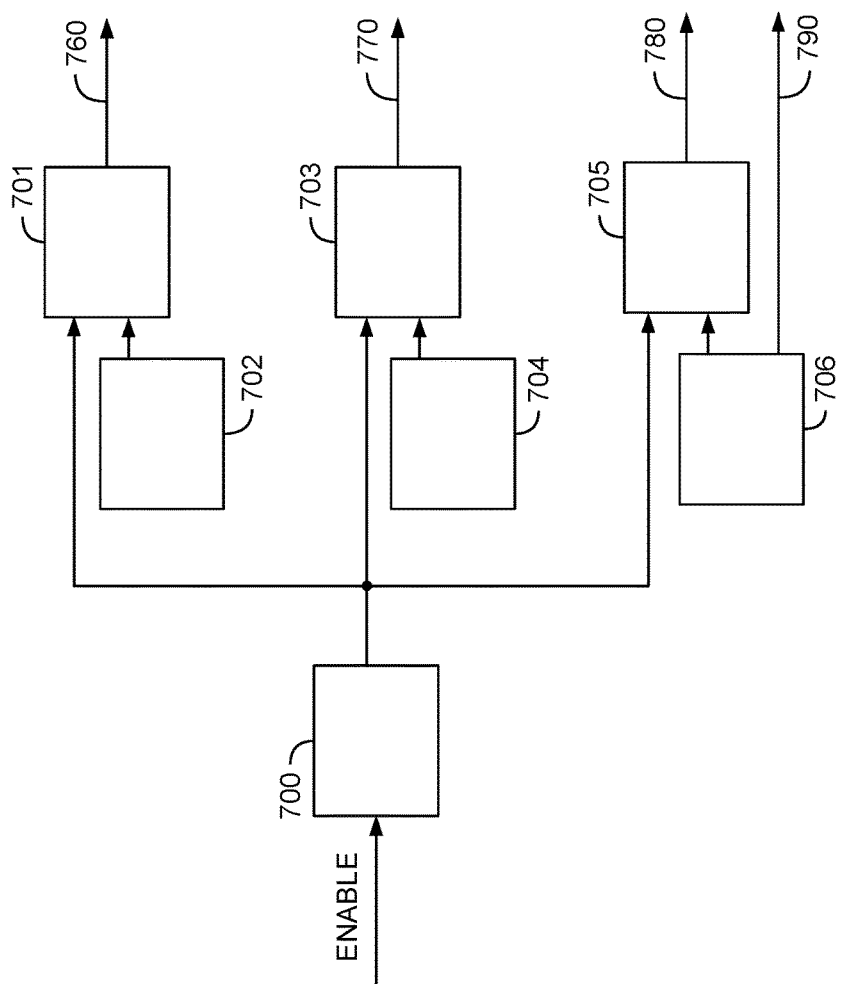
FIG. 7 is a diagram of an illustrative status flag generation circuit in accordance with an embodiment.

An illustrative embodiment of a status flag generation circuit such as status flag generation circuit 402 of FIG. 4 is shown in FIG. 7. As shown, the status flag generation circuit may receive an enable signal and generate status flag signals at outputs 760, 770, 780, and 790.

If desired, the status flag generation circuit may include modulo counter 700, constant number storage circuits 702, 704, and 706, and comparators 701, 703, and 705. Modulo counter 700 may receive an enable signal, count up to a predetermined number, and output a modulo counter output signal. For example, to generate the transpose of a two-dimensional array with M=3 rows and N=5 columns, modulo counter 700 may implement a modulo (M*N) counter that repeatedly counts from 0 to 14, and outputs the respective modulo counter output signal as long as the enable signal is asserted.

If desired, modulo counter 700 may increment the modulo counter output signal based on a clock signal. For example, modulo counter 700 may increment the modulo counter output signal once every clock cycle. As another example, modulo counter 700 may increment the modulo counter output signal once every p clock cycles where p can be a predetermined number.

As shown in FIG. 7, comparators 701, 703, and 705 may receive the modulo counter output signal and a respective constant number signal from respective constant number storage circuits 702, 704, and 706 and generate respective status flag signals at outputs 760, 770, and 780 based on the comparison of the modulo counter output signal with the respective constant number signal.

For example, constant number storage 702 may store a constant number that corresponds to the number of columns N of the two-dimensional array (e.g., N=5 as in the example above). Thus, comparator 701 may provide a status flag signal '0' when the modulo counter output signal is different than N and a status flag signal '1' when the modulo counter output signal is equal to N.

FIG. 5, respectively, that latches 601 and 603 of FIG. 6 are initialized to one, and that constant number storage 504, 602, 606, 702, 704, and 706 store (M*N−1), zero, zero, N, zero, and (M*N−1), respectively.

In this scenario, the different components of the modulo adder circuit of FIG. 5, the address processing circuit of FIG. 6, and the status flag generation circuit of FIG. 7 may generate the following signals:

TABLE 12

Signals in the address generation circuit

| cycle | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| 700 | 0 | 1 | 2 | 3 | 4 | 5 | 6 | 7 | 8 | 9 | 10 | 11 | 12 | 13 | 14 |
| 601 | 1 | 1 | 1 | 1 | 1 | 1 | 5 | 5 | 5 | 5 | 5 | 5 | 5 | 5 | 5 |
| 603 | 1 | 1 | 1 | 1 | 1 | 1 | 1 | 1 | 1 | 1 | 1 | 1 | 1 | 1 | 1 |
| 605 | 0 | 1 | 2 | 3 | 4 | 5 | 6 | 7 | 8 | 9 | 10 | 11 | 12 | 13 | 0 |
| 500 | 1 | 2 | 3 | 4 | 5 | 6 | 7 | 8 | 9 | 10 | 11 | 12 | 13 | 14 | 1 |
| 501 | −13 | −12 | −11 | −10 | −9 | −8 | −7 | −6 | −5 | −4 | −3 | −2 | −1 | 0 | −13 |
| 604 | 1 | 2 | 3 | 4 | 5 | 6 | 7 | 8 | 9 | 10 | 11 | 12 | 13 | 0 | 1 |
| 600 | ? | 1 | 2 | 3 | 4 | 5 | 6 | 7 | 8 | 9 | 10 | 11 | 12 | 13 | 0 |
| 607 | 0 | 1 | 2 | 3 | 4 | 5 | 6 | 7 | 8 | 9 | 10 | 11 | 12 | 13 | 14 |

| cycle | 15 | 16 | 17 | 18 | 19 | 20 | 21 | 22 | 23 | 24 | 25 | 26 | 27 | 28 | 29 |
|---|---|---|---|---|---|---|---|---|---|---|---|---|---|---|---|
| 700 | 0 | 1 | 2 | 3 | 4 | 5 | 6 | 7 | 8 | 9 | 10 | 11 | 12 | 13 | 14 |
| 601 | 5 | 5 | 5 | 5 | 5 | 5 | 11 | 11 | 11 | 11 | 11 | 11 | 11 | 11 | 11 |
| 603 | 5 | 5 | 5 | 5 | 5 | 5 | 5 | 5 | 5 | 5 | 5 | 5 | 5 | 5 | 5 |
| 605 | 0 | 5 | 10 | 1 | 6 | 11 | 2 | 7 | 12 | 3 | 8 | 13 | 4 | 9 | 0 |
| 500 | 5 | 10 | 15 | 6 | 11 | 16 | 7 | 12 | 15 | 8 | 13 | 18 | 9 | 14 | 19 |
| 501 | −9 | −4 | 1 | −8 | −3 | 2 | −5 | −2 | 3 | −3 | −1 | 4 | −5 | 0 | 5 |
| 604 | 5 | 10 | 1 | 6 | 11 | 2 | 7 | 12 | 3 | 8 | 13 | 4 | 9 | 0 | 5 |
| 600 | 1 | 5 | 10 | 1 | 6 | 11 | 2 | 7 | 12 | 3 | 8 | 13 | 4 | 9 | 0 |
| 607 | 0 | 5 | 10 | 1 | 6 | 11 | 2 | 7 | 12 | 3 | 8 | 13 | 4 | 9 | 14 |

| cycle | 30 | 31 | 32 | 33 | 34 | 35 | 36 | 37 | 38 | 39 | 40 | 41 | 42 | 43 | 44 |
|---|---|---|---|---|---|---|---|---|---|---|---|---|---|---|---|
| 700 | 0 | 1 | 2 | 3 | 4 | 5 | 6 | 7 | 8 | 9 | 10 | 11 | 12 | 13 | 14 |
| 601 | 11 | 11 | 11 | 11 | 11 | 11 | 13 | 13 | 13 | 13 | 13 | 13 | 13 | 13 | 13 |
| 603 | 11 | 11 | 11 | 11 | 11 | 11 | 11 | 11 | 11 | 11 | 11 | 11 | 11 | 11 | 11 |
| 605 | 0 | 11 | 8 | 5 | 2 | 13 | 10 | 7 | 4 | 1 | 12 | 9 | 6 | 3 | 0 |
| 500 | 11 | 22 | 19 | 16 | 13 | 24 | 21 | 18 | 15 | 12 | 23 | 20 | 17 | 14 | 11 |
| 501 | −3 | 8 | 5 | 2 | −1 | 10 | 7 | 4 | 1 | −2 | 9 | 6 | 3 | 0 | −3 |
| 604 | 11 | 8 | 5 | 2 | 13 | 10 | 7 | 4 | 1 | 12 | 9 | 6 | 3 | 0 | 11 |
| 600 | 5 | 11 | 8 | 5 | 2 | 13 | 10 | 7 | 4 | 1 | 12 | 9 | 6 | 3 | 0 |
| 607 | 0 | 11 | 8 | 5 | 2 | 13 | 10 | 7 | 4 | 1 | 12 | 9 | 6 | 3 | 14 |

Constant number storage 704 may store a zero. Thus, comparator 703 may provide a status flag signal '0' when the modulo counter output signal is greater than zero and a status flag signal '1' when the modulo counter output signal is equal to zero.

Constant number storage 706 may store a constant number that corresponds to the product (M*N−1), where M is the number of rows and N the number of columns of the two-dimensional array (e.g., M=3 and N=5 as in the example above). The status flag generation circuit may provide this constant number at output 790, and comparator 705 may provide a status flag signal '0' when the modulo counter output signal is different than (M*N−1) and a status flag signal '1' when the modulo counter output signal is equal to (M*N−1).

Consider the scenario of the above example with M=3 and N=5. Consider further that modulo counter 700 implements a (M*N) counter, that outputs 760, 770, 780, and 790 of the status flag generation circuit are coupled to inputs 660, 670, 680, and 630 of the address generation circuit of FIG. 6, respectively, that outputs 640 and 650 and input 620 of the address generation circuit of FIG. 6 are coupled to inputs 510 and 520 and output 530 of the modulo adder circuit of With multiplexer 607 of the address processing circuit of FIG. 6 generating the addresses that are used to perform write access operations at storage circuit 300 of FIG. 3 for blocks 0, 1, and 2, respectively, and read access operations at storage circuit 300 of FIG. 3 for blocks 0 and 1, respectively (see also TABLES 1, 3, and 6).

Figure 8:
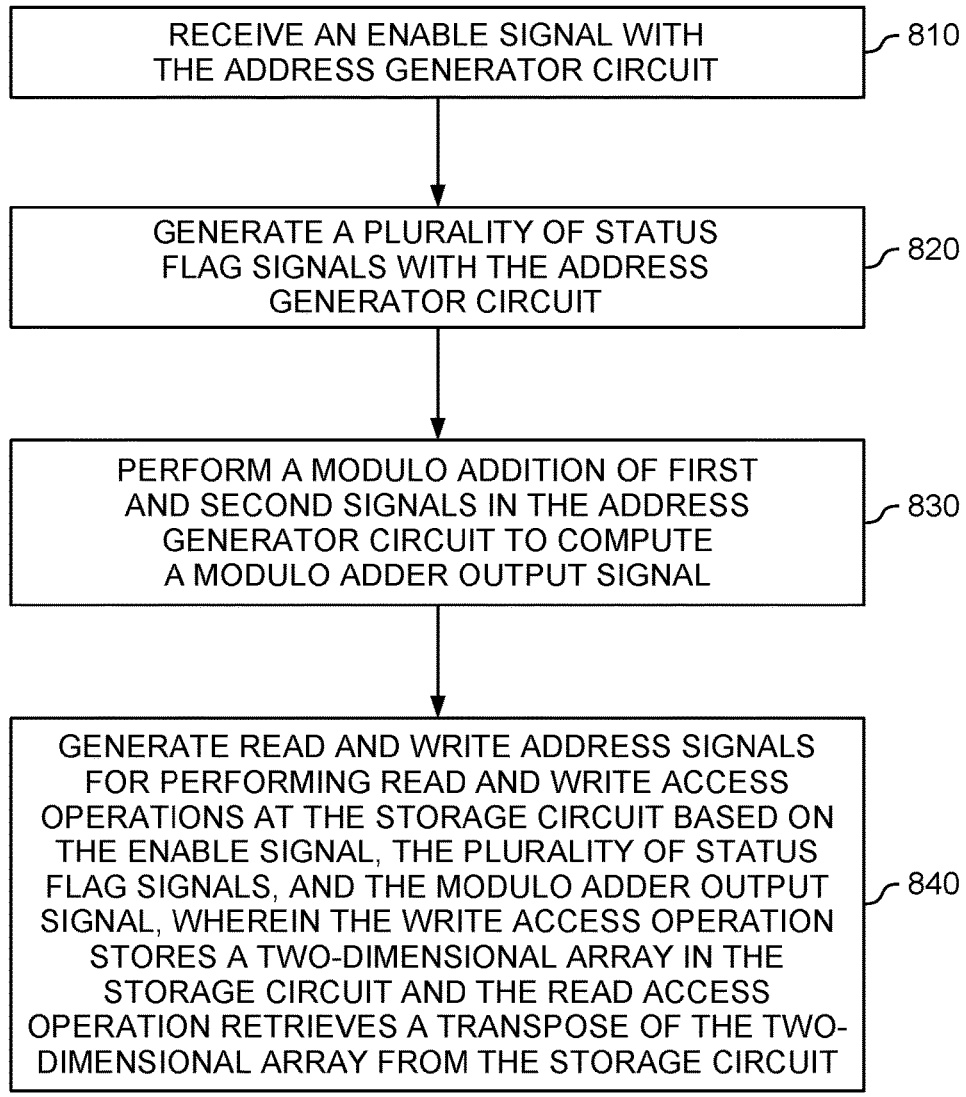
FIG. 8 is a diagram of a flow chart showing illustrative steps for operating an address generator circuit to generate read and write address signals for a storage circuit to generate a transpose of a two-dimensional array in accordance with an embodiment.

FIG. 8 is a diagram of a flow chart showing illustrative steps for operating an address generator circuit, such as address generator circuit 301 of FIG. 3 to generate read and write address signals for a storage circuit such as storage circuit 300 in accordance with an embodiment. During step 810, the address generator circuit may receive an enable signal. For example, the status flag generation circuit 402 and the address processing circuit 401 of FIG. 4 may receive an enable signal.

During step 820, the address generator circuit 301 may generate a plurality of status flag signals. For example, the status flag generation circuit of FIG. 7 may generate first, second, and third status flag signals at outputs 760, 770, and 780 of the status flag generation circuit.

During step 830, the address generator circuit may perform a modulo addition of first and second signals to compute a modulo adder output signal. For example, the modulo adder circuit of FIG. 5 may receive the first and second signal at inputs 510, 520 and generate a modulo adder output signal at an output 530 of the modulo adder circuit.

During step 840, the address generator circuit may generate read and write address signals for performing read and write access operations at the storage circuit based on the enable signal, the plurality of status flag signals, and the modulo adder output signal. For example, in the two-dimensional array transpose circuit of FIG. 3, the write access operation may store a two-dimensional array in storage circuit 300 and the read access operation may retrieve a transpose of the two-dimensional array from the storage circuit 300.

The method and apparatus described herein may be incorporated into any suitable electronic device or system of electronic devices. For example, the method and apparatus may be incorporated into numerous types of devices such as microprocessors or other integrated circuits. Exemplary integrated circuits include programmable array logic (PAL), programmable logic arrays (PLAs), field programmable logic arrays (FPGAs), electrically programmable logic devices (EPLDs), electrically erasable programmable logic devices (EEPLDs), logic cell arrays (LCAs), field programmable gate arrays (FPGAs), coarse-grained reconfigurable architectures (CGRAs), application specific standard products (ASSPs), application specific integrated circuits (ASICs), just to name a few.

The integrated circuit described herein may be part of a data processing system that includes one or more of the following components; a processor; memory; I/O circuitry; and peripheral devices. The data processing system can be used in a wide variety of applications, such as computer networking, data networking, instrumentation, video processing, digital signal processing, or any suitable other application where the advantage of generating a transpose of a two-dimensional array is desirable.

The integrated circuit may be configured to perform a variety of different logic functions. For example, the integrated circuit may be configured as a processor or controller that works in cooperation with a system processor. The integrated circuit may also be used as an arbiter for arbitrating access to a shared resource in the data processing system. In yet another example, the integrated circuit may be configured as an interface between a processor and one of the other components in the system. In one embodiment, the integrated circuit may be one of the families of devices owned by the assignee.

Although the method operations were described in a specific order, it should be understood that other operations may be performed in between described operations, described operations may be adjusted so that they occur at slightly different times or described operations may be distributed in a system which allows the occurrence of the processing operations at various intervals associated with the processing, as long as the processing of the overlay operations are performed in a desired way.

The foregoing is merely illustrative of the principles of this invention and various modifications can be made by those skilled in the art without departing from the scope and spirit of the invention. The foregoing embodiments may be implemented individually or in any combination.

What is claimed is:

1. An address generator circuit for addressing a storage circuit, comprising:

a status flag generation circuit that generates a plurality of status flag signals;

a modulo adder circuit that receives first and second signals and computes a modulo adder output signal based on the first and second signals; and an address processing circuit that receives the modulo adder output signal from the modulo adder circuit and the plurality of status flag signals from the status flag generation circuit, wherein the address processing circuit provides the first and second signals to the modulo adder circuit and generates address signals for read and write access operations of the storage circuit, wherein the write access operation stores a two-dimensional array in the storage circuit and the read access operation retrieves a transpose of the two-dimensional array from the storage circuit.

2. The address generator circuit of claim 1, wherein the address processing circuit further comprises:

a delay circuit that delays the modulo adder output signal by a predetermined time to provide a delayed modulo adder output signal; and an additional storage circuit that stores the delayed modulo adder output signal to provide a stored signal.

3. The address generator circuit of claim 2, wherein the address processing circuit further comprises:

a multiplexer that receives the stored signal from the additional storage circuit, a constant number signal, and an enable signal, selects the first signal among the stored signal and the constant number signal based on the enable signal, and provides the first signal to the modulo adder circuit.

4. The address generator circuit of claim 2 further comprising:

a multiplexer that receives the delayed modulo adder output signal, a constant number signal, and a status flag signal of the plurality of status flag signals, selects the second signal among the delayed modulo adder output signal and the constant number signal based on the status flag signal, and provides the second signal to the modulo adder circuit.

5. The address generator circuit of claim 4 further comprising:

an additional multiplexer that receives the second signal from the multiplexer, an additional constant number signal, and an additional status flag signal of the plurality of status flag signals, selects the address signals among the second signal and the additional constant number signal based on the additional status flag signal, and provides the address signals for the read and write access operations of the storage circuit.

6. The address generator circuit of claim 1, wherein the modulo adder circuit further comprises:

an adder that adds the first and second signals from the address processing circuit to generate a sum signal;

a subtractor that subtracts a constant number signal from the sum signal to generate a difference signal;

a bit extractor that receives the difference signal and provides a bit extractor output signal that is indicative of whether the difference signal represents a non-negative number; and a multiplexer that receives the sum signal, the difference signal and the bit extractor output signal, and selects the modulo adder output signal among the sum signal and the difference signal based on the bit extractor output signal.

7. The address generator circuit of claim 1, wherein the status flag generation circuit further comprises:
a modulo counter circuit that receives an enable signal and counts up to a predetermined number to provide a modulo counter output signal.

8. The address generator circuit of claim 7, wherein the status flag generation circuit further comprises:
a first comparator that generates a first status flag signal of the plurality of status flag signals based on a first comparison of the modulo counter output signal with a first constant number signal;
a second comparator that generates a second status flag signal of the plurality of status flag signals based on a second comparison of the modulo counter output signal with a second constant number signal; and
a third comparator that generates a third status flag signal of the plurality of status flag signals based on a third comparison of the modulo counter output signal with a third constant number signal.

9. A method for operating an address generator circuit to generate read and write address signals for a storage circuit, comprising:
receiving an enable signal with the address generator circuit;
generating a plurality of status flag signals with the address generator circuit;
receiving first and second signals with a modulo adder circuit from the address generator circuit;
performing a modulo addition of the first and second signals in the modulo adder circuit to compute a modulo adder output signal; and
with the address generator circuit, generating read and write address signals for performing read and write access operations at the storage circuit based on the enable signal, the plurality of status flag signals, and the modulo adder output signal, wherein the write access operation stores a two-dimensional array in the storage circuit and the read access operation retrieves a transpose of the two-dimensional array from the storage circuit.

10. The method of claim 9, wherein generating the read and write address signals further comprises:
delaying the modulo adder output signal by a predetermined time to provide a delayed modulo adder output signal; and
storing the delayed modulo adder output signal in an additional storage circuit to provide a stored signal.

11. The method of claim 10, further comprising:
generating the first signal by selecting between the stored signal and a constant number signal based on the enable signal.

12. The method of claim 10, further comprising:
generating the second signal by selecting between the delayed modulo adder output signal and a constant number signal based on a status flag signal of the plurality of status flag signals.

13. The method of claim 9, wherein generating the read and write address signals further comprises:
selecting between the second signal and a constant number signal based on a status flag signal of the plurality of status flag signals.

14. The method of claim 9, wherein performing the modulo addition of the first and second signals further comprises:
adding the first and second signals to generate a sum;
comparing the sum with a predetermined maximum value;
in response to determining that the sum is smaller than the predetermined maximum value, outputting the sum as the modulo adder output signal; and
in response to determining that the sum is greater than or equal to the predetermined maximum value, outputting a difference between the sum and the predetermined maximum value as the modulo adder output signal.

15. The method of claim 9 further comprises:
generating a status flag signal of the plurality of status flag signals based on a comparison of a constant number with an output signal of a modulo counter circuit.

16. An integrated circuit with a two-dimensional array transpose circuit, comprising:
a storage circuit that receives a two-dimensional array and provides a transpose of the two-dimensional array;
a modulo adder circuit that receives first and second signals and provides a modulo adder output signal based on the first and second signals; and
an address generator circuit that provides the first and second signals to the modulo adder circuit, receives the modulo adder output signal from the modulo adder circuit, and generates first and second address signals, wherein the storage circuit uses the first address signal to perform a write access operation that stores the two-dimensional array in the storage circuit, and wherein the storage circuit uses the second address to perform a read access operation that retrieves the transpose of the two-dimensional array from the storage circuit.

17. The integrated circuit of claim 16, wherein the modulo adder circuit performs a modulo addition of the first and second signals to provide the modulo adder output signal.

18. The integrated circuit of claim 17, wherein the address generator circuit further comprises:
a status flag generation circuit that performs a modulo count operation based on a predetermined maximum number and generates a status flag signal based on a comparison of a constant number with a result of the modulo count operation.

19. The integrated circuit of claim 18, wherein the address generator circuit further comprises:
an address processing circuit that generates the first and second address signals based on the status flag and the modulo adder output signal.

20. The integrated circuit of claim 16, wherein the storage circuit comprises:
dual-port memory circuitry with first and second ports that uses the second address signal for performing the read access operation from the first port before using the second address signal for performing an additional write access operation at the second port.

* * * * *